R. E. HELLMUND.
INDUCTION MOTOR.
APPLICATION FILED JUNE 28, 1911.
1,158,495.
Patented Nov. 2, 1915.
2 SHEETS—SHEET 2.
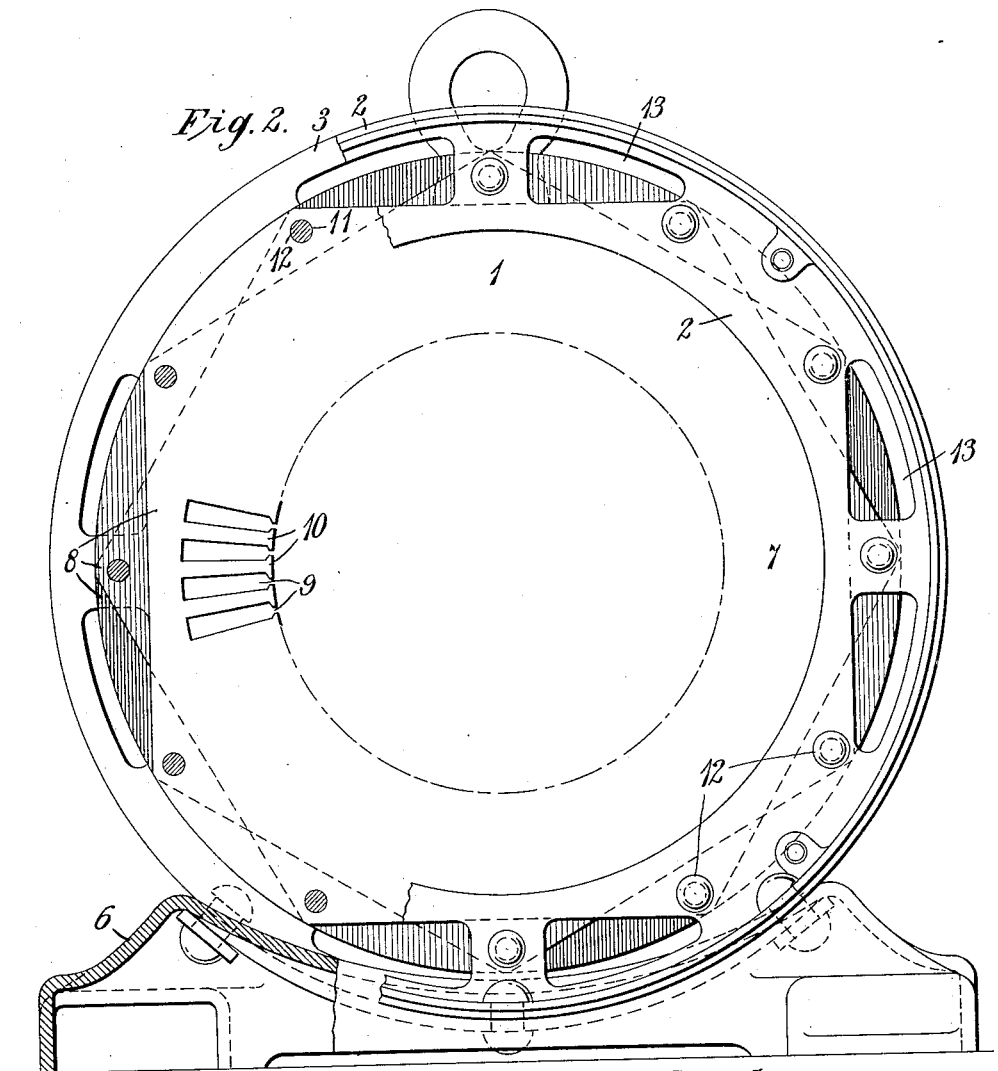
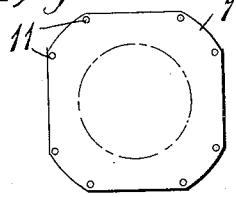
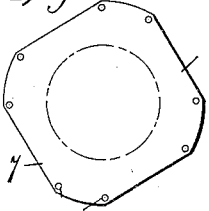
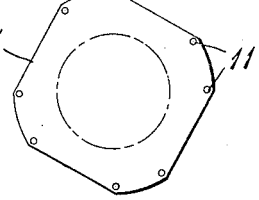
WITNESSES:
INVENTOR
Rudolf E. Hellmund
BY
ATTORNEY

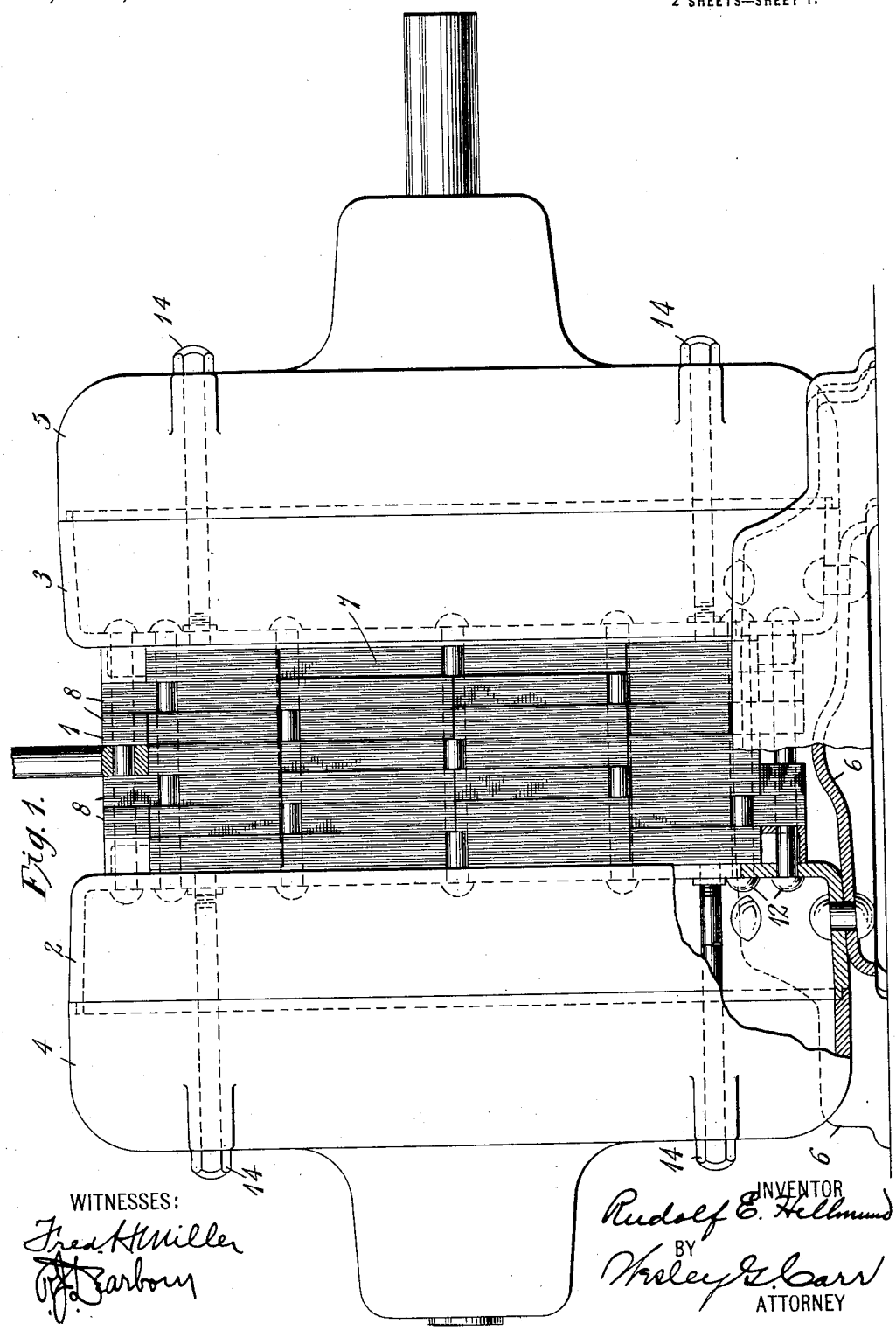

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

INDUCTION-MOTOR.

1,158,495.      Specification of Letters Patent.      Patented Nov. 2, 1915.

Application filed June 28, 1911. Serial No. 635,903.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Induction-Motors, of which the following is a specification.

My invention relates to dynamo-electric machines and it has special reference to the core structures and the ventilation of asynchronous motors.

One object of my invention is to provide a core structure having a flux path of substantially uniform reluctance and composed of square or nearly square laminæ.

Another object of my invention is to provide a stator particularly adapted for induction motors and consisting of end members which are substituted for the usual frame of the machine and means for blowing air across the exposed surface of the core member.

Induction motors and other dynamo-electric machines, as heretofore usually constructed, comprise stationary cylindrical frames having foot projections, end brackets in which shaft bearings are supported and substantially cylindrical laminated core members assembled in the cylindrical frames and clamped to them by end plates which are held in position by suitable keys.

According to my present invention, I materially simplify the structure by omitting the stationary cylindrical frame entirely and substitute therefor a pair of end rings which are secured to the structure by the same bolts or rivets that hold the laminæ together. The laminæ of which the core member itself is composed are stamped from relatively small square plates, only the corners of the laminæ being rounded. The laminæ are assembled in groups, which are staggered relative to each other, in order to equalize the sectional area of the core member.

Figure 1 of the accompanying drawings is a partially sectional elevation of a motor constructed in accordance with my invention; Fig. 2 is an end view of the motor shown in Fig. 1, with certain of the parts broken away to disclose the arrangement of core plates, and Figs. 3, 4 and 5 are views, on a relatively small scale, illustrating the arrangement of the groups of laminæ in the core member of the motor shown in the other figures.

Referring to the drawings, the motor here shown comprises a laminated core member 1, a pair of end rings 2 and 3, end brackets 4 and 5 and a base or supporting structure 6.

The core structure 1 is built up of a large number of punched plates or laminæ 7 having the form shown in Fig. 3, and arranged in groups 8, as shown in Fig. 1, which are staggered or skewed, as shown in Fig. 2. Each core plate is provided with a central opening which determines the bore of the machine, adjacent to which slots 9 are cut to produce the usual core teeth 10. Each of the core plates is substantially square in outline, the corners being rounded; however, in order to reduce the cost of the motor and the amount of scrap material resulting from the manufacture of the core members.

Although there are a number of groups of punchings, there are only three different group arrangements which are respectively illustrated in Figs. 3, 4 and 5 of the drawings. By utilizing the staggered arrangement of groups, as shown, the sectional area and the magnetic reluctance are substantially the same at all points in the magnetic circuit.

Holes 11 are provided in the corners of the plates to receive bolts or rivets 12 which hold the plates together and clamp them to the end rings 2 and 3.

The end rings 2 and 3, which are of slightly larger diameter than the core structure, are of substantially L-shape in cross section and are provided with holes 13 through which a circulation of air may be set up across the outer surface of the core member by the use of fan blades (not shown) or other suitable means carried by the rotating part of the machine in a well known manner.

The base or supporting member 6 is riveted, or otherwise secured to the rings 2 and 3 and is preferably stamped out of relatively heavy sheet metal.

The end brackets 4 and 5 may be of any suitable form and are secured to the rings 2 and 3 by means of bolts 14.

The skewed arrangement of core groups provides a very large external radiating surface and, since the core member is not surrounded by any of the usual frame structures, it is evident that the temperature of the motor will be relatively low under normal operating conditions.

Modifications in size and arrangement of parts may, of course, be made within the spirit and scope of my invention.

I claim as my invention:

1. A stator for dynamo-electric machines comprising a plurality of skewed or staggered polygonal plates, externally concave end rings having inwardly projecting flanges, means for clamping said plates between the flanges of said end rings, and a supporting base upon which said end rings rest and to which they are clamped.

2. A stator for dynamo-electric machines comprising a pair of externally concave end rings having inwardly projecting flanges, a plurality of interposed skewed or staggered polygonal plates of magnetizable material, means for clamping the corners of said plates between said end ring flanges, and a supporting base upon which said end rings rest and to which they are clamped.

3. A stator for dynamo-electric machines comprising a pair of end rings and a plurality of groups of square plates having rounded corners, said groups being skewed or staggered relative to each other.

4. A stator for dynamo-electric machines comprising a plurality of groups of square plates having rounded corners, said groups being skewed or staggered relative to each other, a pair of externally concave end rings having inwardly projecting flanges and means for clamping the rounded corners of said plates between the flanges of said end rings.

5. A stator for dynamo-electric machines comprising a pair of externally concave end rings comprising inwardly projecting flanges, interposed core laminæ, and means for clamping the laminæ between the ring flanges, the flanges being provided with openings through which air currents may pass to the outer surfaces of the core laminæ.

6. A stator for dynamo-electric machines comprising a pair of end rings having inwardly extending flanges at their adjacent edges and a plurality of skewed or staggered groups of square magnetizable plates having rounded corners, said ring flanges being provided with spaced openings through which air currents may pass to the outer surfaces of the assembled plates.

In testimony whereof, I have hereunto subscribed my name this 22nd day of June, 1911.

RUDOLF E. HELLMUND.

Witnesses:
R. E. FERRY,
B. B. HINES.

Copies of this patent may be obtained for five cents each, by addressing the "Commissioner of Patents, Washington, D. C."